Oct. 14, 1924. 1,511,822
W. J. BELCHER
DRIVE CHAIN AND METHOD OF MAKING THE SAME
Filed Nov. 1, 1921 2 Sheets—Sheet 1
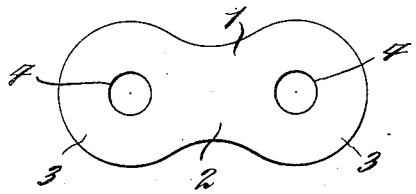
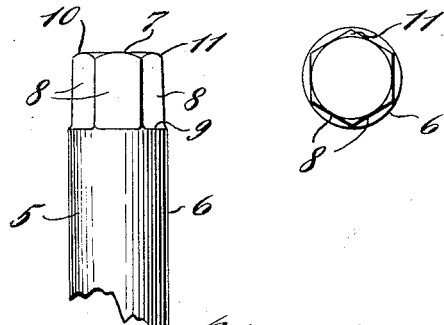
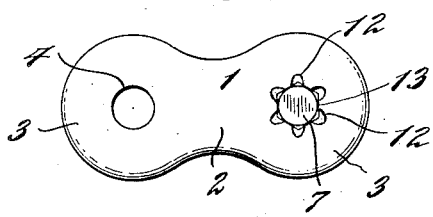
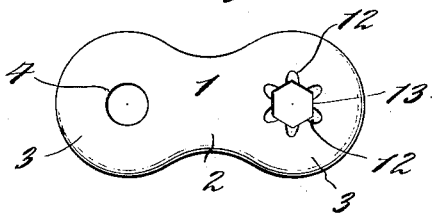
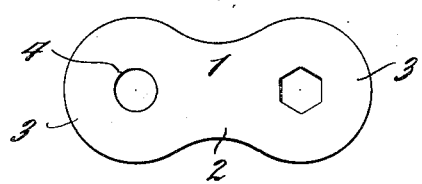
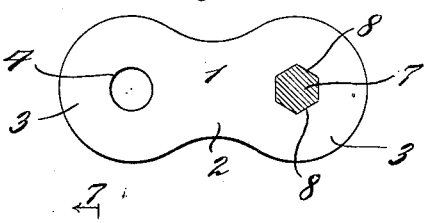
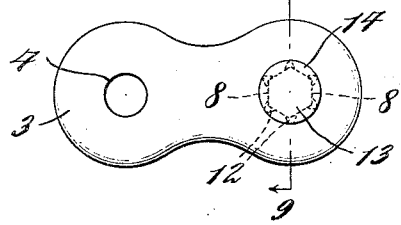
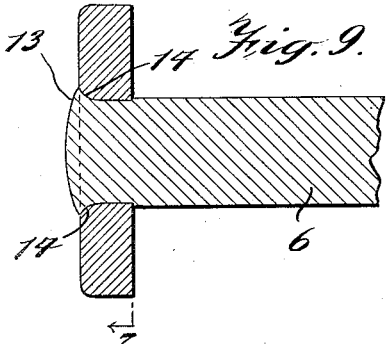
Warren J. Belcher INVENTOR.
BY
Gifford & Bull
his ATTORNEYS Oct. 14, 1924.
W. J. BELCHER
1,511,822
DRIVE CHAIN AND METHOD OF MAKING THE SAME
Filed Nov. 1, 1921
2 Sheets-Sheet 2
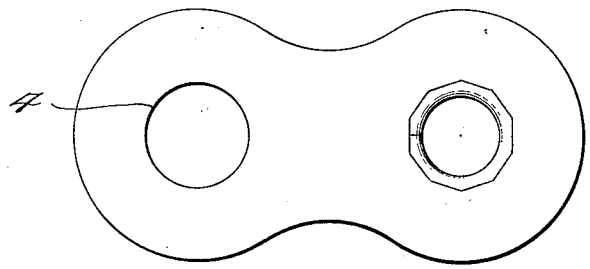
 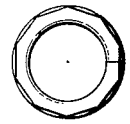
Warren J. Belcher INVENTOR.
BY
Gifford and Bull
ATTORNEY.

Patented Oct. 14, 1924.

1,511,822

UNITED STATES PATENT OFFICE.

WARREN J. BELCHER, OF HARTFORD, CONNECTICUT, ASSIGNOR TO THE WHITNEY MFG. CO., OF HARTFORD, CONNECTICUT, A CORPORATION OF CONNECTICUT.

DRIVE CHAIN AND METHOD OF MAKING THE SAME.

Application filed November 1, 1921. Serial No. 512,052.

*To all whom it may concern:*

Be it known that I, WARREN J. BELCHER, a citizen of the United States, residing at Hartford, in the county of Hartford and State of Connecticut, have invented certain new and useful Improvements in Drive Chains and Methods of Making the Same, of which the following is a specification.

My invention relates to new and useful improvements in drive or transmission chains of that character or type comprising side plates or links provided with transverse members by which the side plates or links are connected to each other to make up the chain structure, and particularly contemplates improved means, and the method of effecting the same, for rigidly connecting a transverse member, either in the form of a pin or bushing, to a side plate or link, whereby the latter and said transverse member are rigidly and securely united.

The invention consists in the improved article and method to be more fully described hereinafter, and the novelty of which will be particularly pointed out and distinctly claimed.

I have fully and clearly illustrated the invention in the accompanying drawings to be taken as a part of this specification, and wherein—

Figure 1 is a view in front elevation of a chain side plate of one form to which my invention is applicable;

Fig. 2 is a view in side elevation of a transverse member in the form of a pin adapted to be assembled with the plate shown in Fig. 1;

Fig. 3 is an end view of the transverse member shown in Fig. 2;

Fig. 4 is a view in side elevation of the plate shown in Fig. 1, showing the transverse member or pin in assembled relation thereto at an intermediate stage in the assembling operation;

Fig. 5 is a view in side elevation of the side plate shown in Fig. 4, but having the pin removed from the opening therein;

Fig. 6 is a view in side elevation of the side plate shown in Figs. 4 and 5, but viewed from the opposite face, as shown in said figures;

Fig. 7 is a view on the line 7—7 of Fig. 9;

Fig. 8 is a view in side elevation showing the side plate and transverse member, the latter in end elevation when in completed assembled relation;

Fig. 9 is a section on the line 9—9 of Fig. 8;

Fig. 10 is a view in side elevation of an embodiment of the invention, wherein the transverse member comprises a tubular member or bushing, as distinguished from a solid pin member;

Fig. 11 is a view in side elevation of a bushing member as employed in the form of the invention shown in Fig. 10, and Fig. 12 is an end view of the bushing member shown in Fig. 11.

Referring to the drawings by characters of reference, 1 designates a side plate or link of a chain member of the well-known sprocket type, the same consisting of an intermediate portion 2 and end heads 3, 3, each of the latter containing a central circular opening 4. I desire it understood that the invention is illustrated in connection with a side-plate or link of a sprocket chain of well-known type merely by way of example, and is not to be limited to such type, as it is applicable with equal facility to any chain wherein a transverse member is rigidly fixed in a chain side plate or its equivalent.

5 designates one end portion of a transverse connecting member, the same consisting of a pin, including a cylindrical part 6 and an end part 7, the latter being adapted to be seated in one of the openings 4 in the side plate 1. The end portion 7 is formed with a plurality of flat faces 8, in the present embodiment being six in number, said faces being of equal transverse width and arranged symmetrically in such relation that the pin is formed with a hexagonal polyfaced end portion, as will be clearly understood from Figures 2 and 3 of the drawings. The hexagonal end portion of the pin member at its outer end is of a diameter between opposite faces 8 substantially equal to the diameter of the opening 4, but said hexagonal portion is slightly tapered from a shoulder 9 at its base toward the extreme end 10 of the pin. The extreme end of the hexagonal portion of the pin is preferably chamfered off, as at 11, in order to facilitate centering of the same relative to the opening 4 when the parts are to be assembled. When the pin is to be assembled in the opening 4 of the plate 1, said plate is held rigidly, in any suitable manner, and the end of the pin 5 set adjacent to the opening 4 and centered relatively to the latter, whereupon sufficient pressure is applied to the pin longitudinally of the latter to force the same into position within said opening. The pressure necessary to force the pin into the opening may be six (6) tons or more, and is effected, if desired, by a hydraulic press. The length of the hexagonal or polyfaced end portion of the pin is such that the extreme end portion will project preferably beyond one face of the side plate when the shoulder 9 is brought up against the opposite face of the plate. By this operation, the metal of the wall of the opening 4 is forced to conform to the form of the polyfaced head of the pin and the latter is held strongly and rigidly in said opening by the friction resulting. The act of forcing the pin in place results in the outer face of the plate—that is, that face from which the polyfaced end of the pin projects, being given the novel formation shown in Figs. 4 and 5—that is, with recesses 12 located at and spanning the angles between the polyfaced faces 8, and intervening projections 13 which conform to and engage said faces 8, respectively, at portions intermediate the angles between said faces. This is due to displacement of the metal of the plate by the cutting edges formed at the angles on the pin between the faces 8. It will be seen, upon examination of Figs. 4, 5, 6 and 7, that the opening 4 at its end portion adjacent the shoulder 9 is hexagonal or polyfaced and conforms to the pin 5, and that the recesses 12 are formed at the ends of the angles or corners at which the polyfaced walls of the opening 4 join. The projecting end of the pin may then be riveted over, as at 13, on the outside of the side plate or link, so that the metal of the pin in being headed is thrown over, as at 14, and enters said recesses 12, and the pin is held not only against longitudinal displacement, but also against turning in the opening 4, the metal portions 14 of the pin entering the recesses 12 acting as keys. It will be understood that the riveting can be accomplished with the pin either hot or cold.

In the form shown in Figs. 10 to 12, inclusive, the invention is applied to the assembling of bushings or tubular members instead of pins, in connection with a side plate or link. In this case, due to the thinness of the bushing wall, it is desirable to use more faces than are used on a solid pin, in order to prevent distortion of the bushing when the latter is forced into the opening 4 under heavy pressure, for example, the polyfaced end of the bushing may have ten faces arranged symmetrically. However, when the bushing is centered in the opening and forced into place, the wall of the opening conforms to the polyfaced end of the bushing. In this embodiment of the invention, the peculiar recesses 12 do not result, due to the fact that by the use of a larger number of faces on the bushing the angle between said faces is not sufficient to cause the displacement of the metal of the side plate resulting in such recesses. It will also be understood that in this case the bushing is not riveted over into place as is done when the transverse member consists of a solid pin.

What I claim and desire to secure by Letters Patent of the United States is:—

1. The method of uniting side plates and transverse members of a chain, which consists in providing a plate with a circular opening, and a transverse member with a polyfaced end portion, the diameter of the transverse member between opposite faces being substantially equal to the diameter of said opening, and forcing said polyfaced portion into said opening under sufficient pressure to cause the wall of said opening to conform to the said polyfaced portion.

2. The method of uniting side plates and transverse members of a chain, which consists in providing a plate with a circular opening, and a transverse member with a tapered polyfaced end portion, the diameter of the transverse member at its outer end and between opposite faces being substantially equal to the diameter of said opening, and forcing said polyfaced portion into said opening under sufficient pressure to cause the wall of said opening to conform to the said polyfaced portion.

3. The method of uniting side plates and transverse members of a chain, which consists in providing a plate with a circular opening, and a transverse member with a polyfaced end portion chamfered at its extreme end, the diameter of the transverse member between opposite faces being substantially equal to the diameter of said opening, and forcing said polyfaced portion into said opening under sufficient pressure to cause the wall of said opening to conform to the said polyfaced portion.

4. The method of uniting side plates and transverse members of a chain, which consists in providing a plate with a circular opening, and a transverse member with a tapered polyfaced end portion bevelled at its extreme end, the diameter of the transverse member at its outer end and between opposite faces being substantially equal to the diameter of said opening, and forcing said polyfaced portion into said opening under sufficient pressure to cause the wall of said opening to conform to the said polyfaced portion.

5. The method of uniting plate and transverse members of a chain, which consists in providing a plate with a circular opening and said member with a polyfaced end portion, the diameter of said member between opposite faces being substantially equal to the diameter of the opening in the plate, forcing said polyfaced portion into said opening under sufficient pressure to cause the wall of said opening to conform to the said polyfaced portion and to form a plurality of recesses in said plate about said member, and moving the metal of said member laterally into said recesses.

6. The method of uniting a side plate and a transverse chain member, which consists in forming a side plate with a circular opening, forming a transverse member with an end portion having a plurality of flat faces of equal width and arranged symmetrically at angles to each other, the diameter of said member between opposite faces being substantially equal to the diameter of said opening, and forcing said end portion into said opening under sufficient pressure to cause the opening to conform to said end portion.

7. The method of uniting side plates and transverse members of a chain, which consists in providing a plate with an opening, and a transverse member with a polyfaced end portion, and forcing said polyfaced portion into said opening under sufficient pressure to cause said transverse member to be held therein, and riveting over the end of said transverse member.

8. In combination, a chain side plate or link having a polyfaced opening, and a transverse member having a cylindrical part and a polyfaced end portion tapered from the cylindrical portion and received within and conforming to said polyfaced opening and frictionally held therein.

9. In combination, a chain side plate having a polyfaced opening, and a transverse member having a cylindrical part and an end portion having a plurality of faces forming shoulders with said cylindrical part, said end portion being received within said opening and conforming thereto with said shoulders engaging said plate, the end of said member being riveted over.

10. A chain side plate or link having a polyfaced opening, a transverse member having a correspondingly polyfaced end portion seated in said opening and held therein by friction, recesses at the angles between the faces of said opening, and the transverse member being riveted over so that the metal thereof is deposited in said recesses.

11. A chain side plate or link having an opening having a wall composed of flat faces of equal width arranged symmetrically at angles to each other about the center of the opening, a transverse member having a correspondingly formed end portion seated in said opening and held therein by friction, recesses in the wall of said opening at the angles between said flat faces, said member being riveted over so that the metal thereof is deposited in said recesses.

In testimony whereof I have hereunto signed my name in the presence of two subscribing witnesses.

WARREN J. BELCHER.

Witnesses:
PARK C. BOYD,
RAYMOND W. RANDALL.